United States Patent

Tayne et al.

[11] Patent Number: 5,863,161
[45] Date of Patent: Jan. 26, 1999

[54] COUNTERSINKING TOOL WITH REMOVABLE CUTTING INSERTS

[75] Inventors: Bret Tayne, Lincolnwood; John M. Husar, Hoffman Estates, both of Ill.

[73] Assignee: Everede Acquisition Corp., Chicago, Ill.

[21] Appl. No.: 726,022

[22] Filed: Oct. 4, 1996

[51] Int. Cl.⁶ ............................................. B23B 51/10
[52] U.S. Cl. ..................... 408/224; 408/229; 408/713
[58] Field of Search ........................... 408/223, 224, 408/227, 229, 199, 231, 233, 713, 225; 407/33, 42, 48, 61, 62

[56] References Cited

U.S. PATENT DOCUMENTS

| | | | |
|---|---|---|---|
| 3,163,920 | 1/1965 | Stier | 407/46 |
| 4,165,201 | 8/1979 | Heule | 408/227 |
| 4,197,042 | 4/1980 | Krhounek et al. | 408/713 |
| 4,353,670 | 10/1982 | Jorgensen | 408/713 |
| 5,071,295 | 12/1991 | Greig | 408/233 |

FOREIGN PATENT DOCUMENTS 4124646  1/1993  Germany ............................... 408/224

*Primary Examiner*—Daniel W. Howell
*Attorney, Agent, or Firm*—Wallenstein & Wagner, Ltd.

[57] ABSTRACT

A two-fluted countersink tool for countersinking holes comprising a holder and removable cutting inserts. The cutting holder having a body with two portions removed to define a first and second pocket. Each insert has first and second ends, first and second lateral surfaces, first, second and third top surfaces and a bottom surface. The cutting surface of each cutting insert extends from an edge of the third top surface. The cutting surface has a first cutting edge and a second cutting edge.

The cutting inserts are positioned inside the pockets and are attached to the holder such that the cutting edge remains as close as possible to the centerline of the countersink tool.

32 Claims, 2 Drawing Sheets

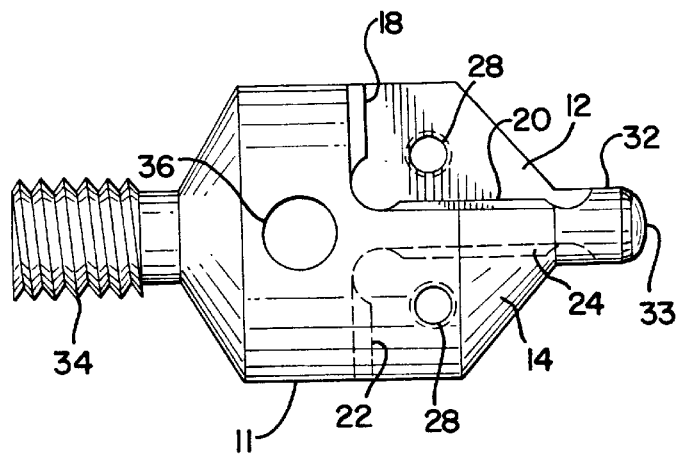
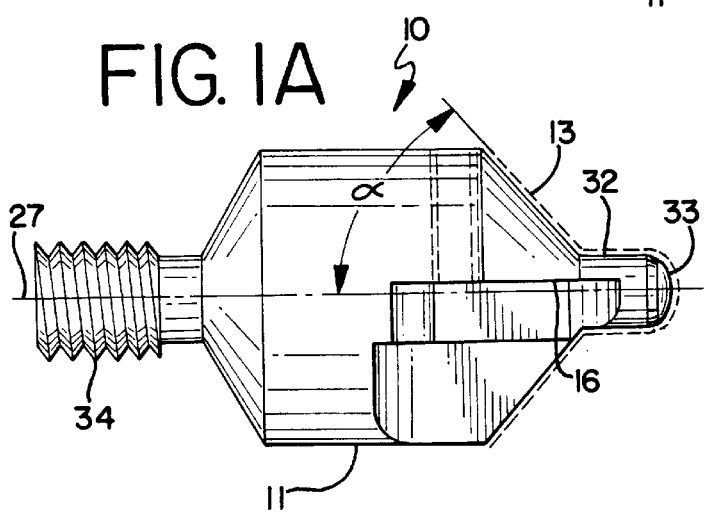
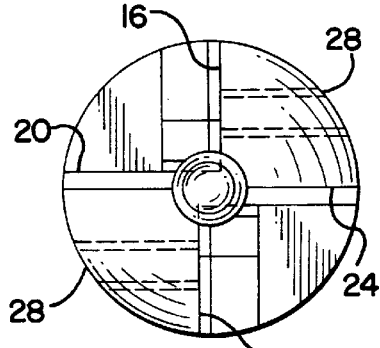
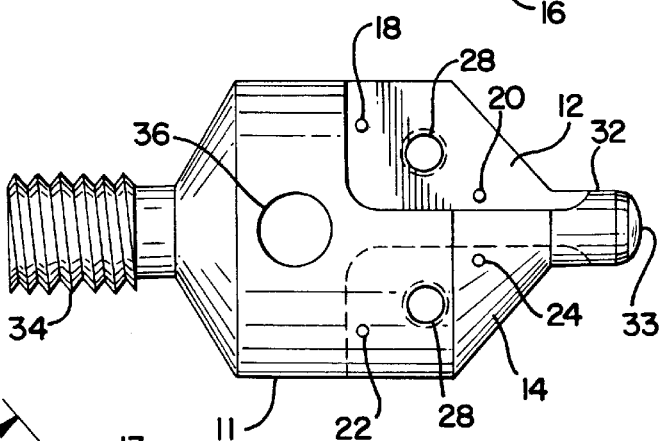
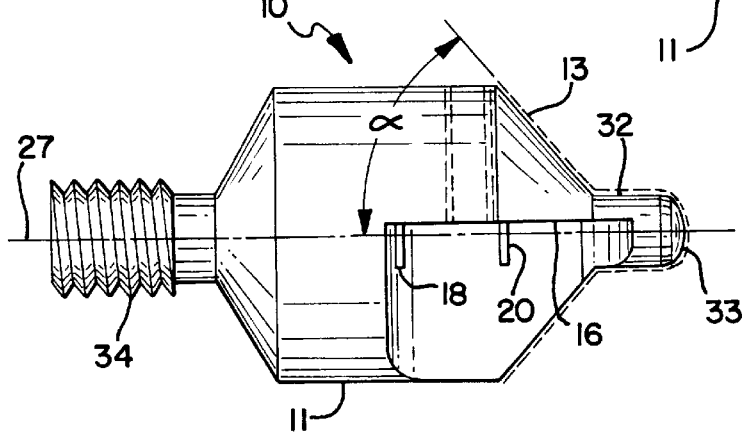

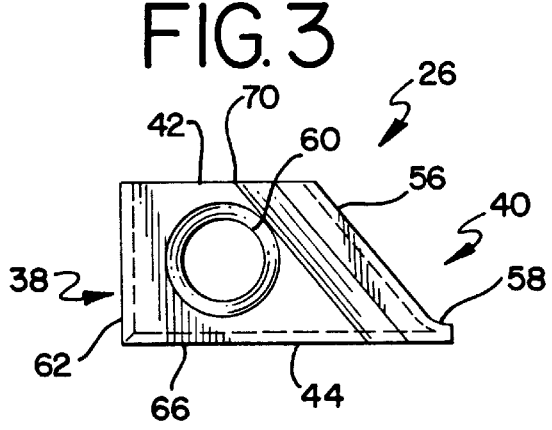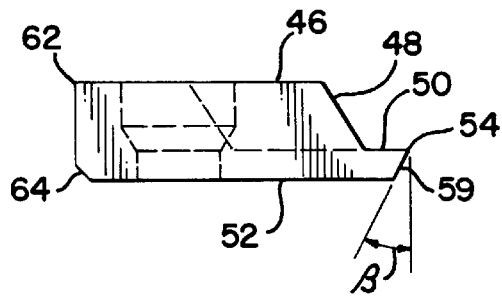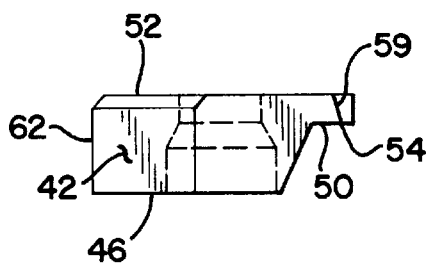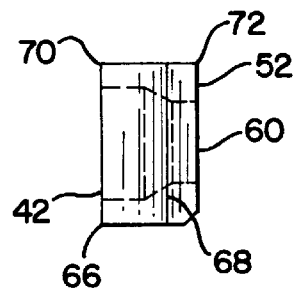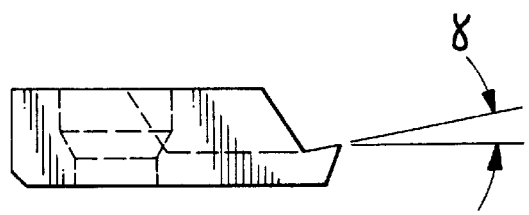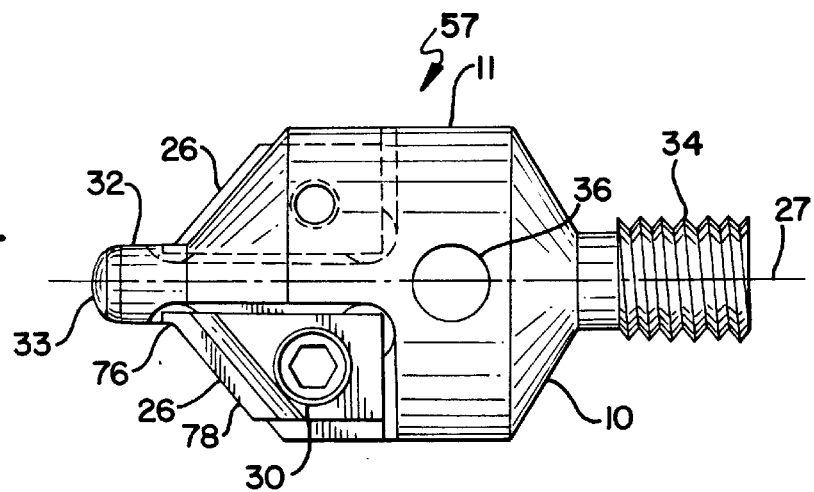

COUNTERSINKING TOOL WITH REMOVABLE CUTTING INSERTS

TECHNICAL FIELD

The present invention relates generally to metal cutting tools and more particularly to a two-fluted countersinking tool having removable cutting inserts.

BACKGROUND OF THE INVENTION

When the countersunk part of a hole is formed, it will accommodate the head of a fastener, such as a rivet or screw, having a shank portion from which extends a terminal or head portion flaring angularly outward from the shank portion. Thus, in the countersunk part of the hole, the outwardly flaring portion engages the head portion of the fastener.

Conventional countersink tools include a rotating shaft, with the cutting edges constituting an integral part thereof. However, this type of countersink tool has a relatively large initial expense when comparing the cost of the countersink tool to the number of holes that it will countersink before the integral edges on the tool wear out. Moreover, when the integral edges on a conventional countersink tool wear out, the entire countersink tool must be subjected to a regrinding operation which is a relatively complicated, time-consuming and an expensive operation. This regrinding operation must be performed on a special machine which can accommodate the entire countersink tool. The regrinding operation was necessary, however, because the large initial expense of the countersink tool made it too expensive to throw it away after it wore down. Furthermore, the cutting edges on an integral countersink tool can be reground only a limited number of times. Eventually, the edges cannot be reground, and, thus, the entire tool must be thrown away and replaced.

Other countersink tools having removable countersink inserts have been used to countersink relatively large holes. Because of the large size of these holes, and thus the large size of the countersink holders, multiple fluted tools are used. However, when countersinking smaller size holes, the holder becomes smaller and it is impossible to machine numerous cutaways or pockets in the cutting holder to accommodate multiple cutting inserts.

SUMMARY OF THE INVENTION

A countersink tool in accordance with the present invention eliminates the drawbacks and difficulties of the conventional countersink tools described above. The present countersink tool comprises a holder having a body with two portions removed to define a first and second pocket. The first pocket is spaced from the second pocket. Each pocket has a seating surface in a plane perpendicular to and radially spaced from the axis of rotation, and two locating surfaces, with one locating surface extending parallel to the axis of rotation.

A cutting insert is removably mounted in each pocket. Each cutting insert has first and second ends, first and second lateral surfaces, first, second and third top surfaces and a bottom surface. The cutting surface of each cutting insert extends from an edge of the third top surface. The cutting surface has a first cutting edge and a second cutting edge. The first cutting edge extends along a line transverse to the axis of rotation of the countersink, and the second cutting edge extends from the first cutting edge and has a generally arcuate shape.

The cutting inserts are positioned inside the pockets and are attached to the holder such that the cutting edge remains as close as possible to the centerline of the countersink tool.

An object of the present invention is to provide a countersink tool which incorporates multiple flutes for multiple removable cutting inserts, but still provides a cutting edge substantially at the centerline of the countersink tool.

Other advantages and aspects of the present invention will become apparent upon reading the following description of the drawings and detailed description of the invention.

BRIEF DESCRIPTION OF THE DRAWINGS

FIG. 1 is a front plan view of one embodiment of a two-fluted cutting holder of the present invention.

FIG. 1A is a side elevation view of the two-fluted cutting holder illustrated in FIG. 1.

FIG. 1B is a end elevation view of the two-fluted cutting holder illustrated in FIG. 1.

FIG. 2 is a front plan view of another embodiment of a two-fluted cutting holder of the present invention.

FIG. 2A is a side elevation view of the two-fluted cutting holder illustrated in FIG. 2.

FIG. 3 is a front plan view of one embodiment of a cutting insert of the present invention.

FIG. 3A is a side elevation view of one side of the cutting insert illustrated in FIG. 3.

FIG. 3B is a side elevation view of another side of the cutting insert illustrated in FIG. 3.

FIG. 3C is an end elevation view of the cutting insert illustrated in FIG. 3.

FIG. 3D is a side elevation view of another embodiment of a cutting insert of the present invention.

FIG. 4 is a front plan view of the two-fluted countersink took, including the two-fluted cutting holder and two cutting inserts of the present invention.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

Referring to the drawings, FIG. 1, 1A and 1B depicts one embodiment of the countersink holder 10 of the present invention. This embodiment of the countersink holder 10 is machined out of a unitary piece of metal. In the preferred embodiment, the countersink holder 10 is machined out of any type of tool steel, including D2 tool steel. The countersink holder 10 preferably has a generally cylindrically-shaped body 11 in cross-section, but could have oval or polygonal shapes without departing from the invention. The body 11 further has tapered end members 13 to define a generally frustoconical shape.

The body 11 has two portions removed to define a first pocket 12 and second pocket 14. The first and second pockets 12, 14 are circumferentially spaced preferably 180° apart on the countersink holder 10. Each pocket 12, 14 has a seating surface 16 in a plane perpendicular to and radially spaced apart from the axis of rotation of the countersink holder 10. Each pocket 12, 14 further has two locating members 18, 20, 22, 24 for positioning a cutting insert 26 on the countersink holder 10. Locating members 18 and 22 of the first and second pockets 12, 14, respectively, extend substantially transverse to an axis of rotation 27 of the countersink holder 10. Locating members 20 and 24 of the first and second pockets 12, 14, respectively, extend substantially parallel to the axis of rotation 27 of the countersink holder 10. In this embodiment, the locating members 18, 20, 22, 24 are actually machined surfaces of the countersink holder 10 itself. Because of the need to accurately position each cutting insert 26 on the countersink holder 10, these surfaces 18, 20, 22, 24 must be precision machined to within one thousandth of an inch tolerance.

In another embodiment of the countersink holder 10 illustrated in FIG. 2, all of the locating members 18, 20, 22, 24 of the first and second pockets 12, 14 are cylindrical pins which allow for an accurate point placement of each cutting insert 26. The locating members 18, 20, 22, 24 of both the first and second embodiment, in combination with the seating surface 16, allow for accurate placement of a cutting insert 26 in each respective pocket 12, 14.

A hole 28 in approximately the center of each pocket 12, 14 of the countersink holder 10 is drilled and tapped to allow for a screw or bolt 30 to fixedly mount the cutting insert 26 to the countersink holder 10. However, in the preferred embodiment, the hole 28 may preferably be slightly offset in the pockets 12, 14 toward the intersection of the locating members 18, 20 and 22, 24 in order to securely pull the cutting insert 26 into the locating members 18, 20, 22 and 24.

The countersink holder 10 further comprises a guide 32 which extends axially away from one end of the countersink holder 10. The guide 32 is generally cylindrical in shape and can incorporate a blended spherical radius 33 on a distal end of the guide 32. The guide 32 can either be an integral pilot which is turned and ground from the same stock as the countersink holder 10 itself, or the guide 32 can be a removable pilot which is merely removably attached to the body 11 of the countersink holder 10. The guide 32 should have the same axis of rotation 27 as the countersink holder 10.

A shank 34 extends axially away from the countersink holder 10 in a direction opposite that of the guide 32 and at the opposite end of the countersink holder 10 as the guide 32. The shank 34 can be turned, threaded or machined so that the shank 34 is cylindrical or polygonal-shaped in cross-section. The axis of rotation 27 of the shank 34 should be the same axis of rotation 27 as that of the countersink holder 10. Thus, the shank 34 and the guide 32 should be substantially concentrically disposed upon the countersink holder 10.

The countersink holder 10 further has a hole 36 drilled thru the body 11 of the countersink holder 10, transverse to the countersink holder's 10 axis of rotation 27. This thru hole 36 allows a machine operator to insert a leverage arm (not shown) into the hole 36 in the countersink holder 10 in order to rotate the countersink holder 10, and thus tighten or loosen the countersink holder 10 in its mounting (not shown).

FIG. 3, 3A, 3B and 3C display the cutting insert 26 of the present invention. Each cutting insert 26 is generally formed from a sintered powdered metal such as tungsten carbide. Furthermore, each cutting insert 26 comprises a body having first 38 and second 40 ends, first 42 and second 44 lateral surfaces, first 46, second 48 and third 50 top surfaces and a bottom surface 52. The first 46 top surface is parallel to the bottom surface 52. The third top surface 50 can either be approximately parallel to the first top surface 46 or offset at a raked angle $\gamma$ of about 2°, seen in FIG. 3D. The second top surface 48 is adjacent the first 46 and third 50 top surfaces, extending angularly away from the first top surface 46 toward the bottom surface 52. Thus, the thickness of the insert 26 between the first top surface 46 and the bottom surface 52 is greater than the thickness of the insert 26 between the third top surface 50 and the bottom surface 52. This increased thickness helps lend additional strength to the insert 26 at the point where the insert 26 is connected to the countersink holder 10.

Each cutting insert 26 can be fixedly connected to the countersink holder by passing a screw or bolt 30 through a hole 60 in the cutting insert 26 and into the countersink holder 10. The hole 60 is substantially in the center of the cutting insert 26 and extends from the insert's 26 first top surface 46 to the bottom surface 52. This hole 60 may be countersunk or counterbored, depending upon the type of screw or bolt 30 used to mount the cutting insert 26 to the countersink holder 10.

Thus, the additional thickness of the cutting insert 26 serves multiple purposes. First, the additional thickness between the first top surface 46 and the bottom surface 52 provides the cutting insert 26 with greater strength at the point where the cutting insert 26 is fixed to the countersink holder 10. Second, the reduced thickness between the third top surface 50 and the bottom surface 52 allows the cutting surface 54 to be closer to the centerline of the countersink holder 10. Finally, the combination of varied surfaces and thicknesses allows for the pocket portions 12, 14 of the countersink holder 10 to remain relatively shallow.

In essence, this allows the countersink holder 10 to contain more than one pocket portion 12, 14 or flute. The insert's 26 first lateral surface 42 and second lateral surface 44 are substantially parallel to each other. Furthermore, the insert's 26 first end 38 and first lateral surface 42, and the insert's 26 first end 38 and second lateral surface 44, are at approximately right angles to each other.

The cutting surface 54 of the cutting insert 26 extends along an edge of the second end 40 at the third top surface 50. The cutting surface 54 is defined by two cutting edges, a first cutting edge 56 and a second cutting edge 58. When the cutting insert 26 is mounted in a pocket 12 or 14 of the countersink holder 10 and attached thereto to define a countersinking tool 57, the first cutting edge 56 extends along a line transverse to the axis of rotation 27 of the countersink holder 10 and defines the angle at which the countersink is formed. The countersink thus forms a frustoconical area in the countersunk hole.

The second cutting edge 58 extends from the first cutting edge 56 and has a generally arcuate shape. The arcuate shape has a radius which is defined by the size of the combination of the countersinking holder 10 and cutting inserts 26. The arcuate shape is typically within the range from 0.010 to 0.060 inches. The second end 40 of the cutting insert 26 extends at an angle $\alpha$ to the axis of rotation 27 of the countersink holder 10. The angle $\alpha$ of the first cutting edge 56 is a fixed angle which is set dependent upon the required angle for the countersunk hole. As shown in FIG. 1A, $\alpha$ is 50°. Thus, only by changing the countersink holder 10 and mounting a cutting insert 26 having the corresponding angle $\alpha$ as the countersink holder 10, can the angle of the countersunk hole be varied.

The portion of the cutting insert's second end 40, from the third top surface 50 to the bottom surface 52, extends at an angle $\beta$ back into the cutting insert 26, and toward the bottom surface 52, to define a flank face 59. The angle $\beta$ of the flank face 59 can be varied from insert 26 to insert 26 depending upon the type of material to be countersunk. Typically, the angle $\beta$ will be 15°.

Additionally, some or all of the edges 62, 64, 66, 68, 70, 72 connecting the first top surface 46 to the first end 38, first lateral surface 42 and second lateral surface 44, and the bottom surface 52 to the first end 38, first lateral surface 42 and second lateral surface 44 may be chamfered in order to help better seat the cutting insert 26 on the countersink holder 10.

FIG. 4 displays the countersink tool 57, the combination of the countersink holder 10 and the appropriate number of cutting inserts 26. In combination, a first cutting insert 26 is positioned within the first pocket 12 and is attached to the countersink holder 10, and a second cutting insert 26 is positioned within the second pocket 14 and is attached to the countersink holder 10. When positioning a cutting insert 26 in a pocket 12, 14 of the countersink holder 10, the bottom surface 52 of the cutting insert 26 rests on and contacts the seating surface 16 of the countersink holder 10 such that the plane of the bottom surface 52 of the cutting insert 26 remains perpendicular to the axis of rotation 27 of the countersink tool 57. The first locating surface 18, 22 of pockets 12, 14 provides contact for accurately positioning the first end 38 of cutting insert 26. Similarly, the second locating surface 20, 24 of pockets 12, 14 provides contact for accurately positioning the second lateral surface 44 of cutting insert 26, such that the second lateral surface 44 of cutting insert 26 is substantially parallel to the axis of rotation 27. Once the cutting insert 26 is accurately located in the pocket 12 or 14, a bolt or screw 30 is placed through the thru hole 60 in the cutting insert 26. The bolt or screw 30 is then screwed into the tapped hole 28 in the countersink holder 10, thus fixing the cutting insert 26 to the countersink holder 10.

Once each pocket 12, 14 of the countersink holder 10 contains a cutting insert 26, the countersinking tool 57 is available to be mounted to a machine (not shown) for use in countersinking holes. In combination, the first cutting edge 56 of each cutting insert 26 fixed in the countersinking tool 57 defines a frustoconical surface of revolution when the countersinking tool 57 is rotated about its axis 27. Furthermore, the second cutting edge 58 of each cutting insert 26 of the countersinking tool 57 defines an annular arcuate section 76 adjacent the frustoconical surface 78 when the countersinking tool 57 is rotated. The combination of the frustoconical section 78 and the arcuate section 76 provides a burr free countersink surface for a rivet, screw, bolt, or other fixing device set in the countersunk hole.

While the specific embodiments have been illustrated and described, numerous modifications come to mind without significantly departing from the spirit of the invention and the scope of protection is only limited by the scope of the accompanying claims.

We claim:

1. A cutting insert for a countersink having an axis of rotation, the insert comprising:
    a body having first and second ends, first and second lateral surfaces, first, second and third top surfaces, a bottom surface and a bore extending between the first top surface and the bottom surface; and,
    a cutting surface on the body second end extending along an edge of the third top surface, the cutting surface having a first cutting edge and a second cutting edge, wherein the first cutting edge is adapted to extend along a line transverse to the axis of rotation of the countersink, and wherein the second cutting edge extends from the first cutting edge and has a generally arcuate shape.

2. The cutting insert of claim 1 wherein the second top surface is adjacent the first and third top surfaces, and extends angularly away from the first top surface toward the bottom surface.

3. The cutting insert of claim 2 wherein the third top surface extends from the second top surface in a plane approximately parallel to the first top surface.

4. The cutting insert of claim 2 wherein the third top surface extends from the second top surface at a raked angle.

5. The cutting insert of claim 1 wherein the bore is substantially centrally disposed.

6. The cutting insert of claim 1 wherein a portion is removed from an edge adjoining the first lateral surface to the bottom surface to define a chamfer.

7. The cutting insert of claim 6 wherein the chamfer extends substantially a length of the first lateral surface.

8. The cutting insert of claim 6 wherein a portion is removed from an edge adjoining the first end to the bottom surface to define a chamfer.

9. The cutting insert of claim 8 wherein a portion is removed from an edge adjoining the second lateral surface to the bottom surface to define a chamfer.

10. The cutting insert of claim 1 wherein a surface extending from the cutting surface to the bottom surface defines a flank face.

11. A holder, having an axis of rotation, for use with a cutting insert as a countersinking tool, the holder comprising:
    a body having two portions removed to define a first and second pocket, the first pocket being spaced from the second pocket, the first pocket having a first seating surface in a plane perpendicular to and radially spaced from the axis of rotation, and a first and a second locating means adapted for positioning a first cutting insert in the first pocket, the second locating means of the first pocket extending parallel to the axis of rotation, the second pocket having a second seating surface in a plane perpendicular to and radially spaced from the axis of rotation, and a third and fourth locating means adapted for positioning a second cutting insert in the second pocket, the fourth locating means extending parallel to the axis of rotation, wherein the body has an integral guide means extending axially away from the body and an integral shank extending axially away from the body in a direction opposite that of the integral guide means.

12. The holder of claim 11 wherein each of the first seating surface and the second seating surface is dimensioned to cooperatively engage a bottom surface of separate cutting inserts in the first and second pockets, respectively.

13. The holder of claim 12 wherein the first locating means extends in a direction transverse to the axis of rotation.

14. The holder of claim 11 wherein the first locating means of the first pocket is a surface of the cutting holder.

15. The holder of claim 11 wherein the first locating means of the first pocket is a cylindrical pin, the pin being adapted to be in transverse relation to the insert.

16. The holder of claim 11 wherein the third locating means of the second pocket is a surface of the cutting holder.

17. The holder of claim 11 wherein the third locating means of the second pocket is a cylindrical pin, the pin being adapted to be in transverse relation to the insert.

18. A countersinking tool comprising:
    a holder having a body, the body having two portions removed to define a first and second pocket, the first pocket being spaced from the second pocket, the first pocket having a first seating surface in a plane perpendicular to and radially spaced from the axis of rotation, and a first and a second locating surface, the second locating surface of the first pocket extending parallel to the axis of rotation, and the second pocket having a second seating surface in a plane perpendicular to and radially spaced from the axis of rotation, and a third and a fourth locating surface, the fourth locating surface of the second pocket extending parallel to the axis of rotation;

two removable cutting inserts, the first cutting insert having first and second ends, first and second lateral surfaces, first, second and third top surfaces and a bottom surface, the second cutting insert having third and fourth ends, third and fourth lateral surfaces, first, second and third top surfaces and a bottom surface;

a cutting surface on the first cutting insert second end, extending from an edge of the third top surface, and a cutting surface on the second cutting insert fourth end, extending from an edge of the third top surface, the cutting surface of the first cutting insert having a first cutting edge and a second cutting edge, the first cutting edge extending along a line transverse to the axis of rotation of the countersink and the second cutting edge extending from the first cutting edge and has a generally arcuate shape, the cutting surface of the second cutting insert having a third cutting edge and a fourth cutting edge, the third cutting edge extending along a line transverse to the axis of rotation of the countersink and the fourth cutting edge extending from the third cutting edge and has a generally arcuate shape; and, wherein the first cutting insert is positioned inside the first pocket and is attached to the holder and the second cutting insert is positioned inside the second pocket and is attached to the holder.

19. The holder of claim 11 wherein the integral guide means is a cylindrical integral pilot.

20. The countersinking tool of claim 18 wherein the first locating surface of the first pocket provides contact for accurately positioning the first end of the first cutting insert and the third locating surface of the second pocket provides contact for accurately positioning the third end of the second cutting insert.

21. The holder of claim 11 wherein the shank and the guide are substantially concentrically disposed.

22. The holder of claim 11 further comprising a hole extending through the entire body, transverse to the axis of rotation.

23. A holder, having an axis of rotation, for use with a cutting insert as a countersinking tool, the holder comprising:

a body having two portions removed to define a first and second pocket, the first pocket being spaced from the second pocket, the first pocket having a first seating surface in a plane perpendicular to and radially spaced from the axis of rotation, and a first and a second locating surface adapted for positioning a cutting insert in the first pocket, the second locating surface of the first pocket extending parallel to the axis of rotation, the second pocket having a second seating surface in a plane perpendicular to and radially spaced from the axis of rotation, and a third and a fourth locating surface adapted for positioning a second cutting insert in the second pocket, the fourth locating surface of the second pocket extends parallel to the axis of rotation, an integral guide extending axially away from the cutting holder, and a shank extending axially away from the cutting holder in a direction opposite that of the guide such that the shank and the guide are substantially concentrically disposed.

24. The holder of claim 23 wherein each of the first seating surface and the second seating surface is dimensioned to cooperatively engage a bottom surface of separate cutting inserts in the first and second pocket, respectively.

25. The holder of claim 24 wherein the first locating surface extends in a direction transverse to the axis of rotation.

26. The holder of claim 25 wherein the third locating surface extends in a direction transverse to the axis of rotation.

27. The countersinking tool of claim 18 wherein the first cutting edge of each of the first and second cutting inserts is positioned at an angle $\alpha$ to the axis of rotation.

28. The countersinking tool of claim 27 wherein $\alpha$ is 50°.

29. The countersinking tool of claim 18 wherein the second locating surface of the first pocket provides contact for accurately positioning the second lateral surface of the first cutting insert such that the second lateral surface of the first cutting insert is parallel to the axis of rotation, and the fourth locating surface of the second pocket provides contact for accurately positioning the fourth lateral surface of the second cutting insert such that the fourth lateral surface of the second cutting insert is parallel to the axis of rotation.

30. The countersinking tool of claim 18 wherein the first cutting edge of the first cutting insert and the third cutting edge of the second cutting insert defines a frustoconical surface of revolution when the countersinking tool is rotated about its axis.

31. The countersinking tool of claim 18 wherein the first cutting edge of the first cutting insert and the third cutting edge of the second cutting insert defines an annular arcuate section adjacent the frustoconical surface when the countersinking tool is rotated about its axis.

32. The countersinking tool of claim 18 wherein the holder further comprises a hole extending through the entire body, transverse to the axis of rotation.

* * * * *